(12) United States Patent
Mori et al.

(10) Patent No.: US 10,875,983 B2
(45) Date of Patent: Dec. 29, 2020

(54) PHOTON UPCONVERSION FILM AND METHOD FOR PRODUCING THE SAME

(71) Applicant: WAKAYAMA PREFECTURE, Wakayama (JP)

(72) Inventors: Takeshi Mori, Wakayama (JP); Tomohiro Mori, Wakayama (JP); Akane Saito, Wakayama (JP); Hitoshi Saomoto, Wakayama (JP)

(73) Assignee: WAKAYAMA PREFECTURE, Wakayama (JP)

( * ) Notice: Subject to any disclaimer, the term of this patent is extended or adjusted under 35 U.S.C. 154(b) by 0 days.

(21) Appl. No.: 16/648,785

(22) PCT Filed: Oct. 19, 2018

(86) PCT No.: PCT/JP2018/038959
§ 371 (c)(1),
(2) Date: Mar. 19, 2020

(87) PCT Pub. No.: WO2019/087813
PCT Pub. Date: May 9, 2019

(65) Prior Publication Data
US 2020/0270419 A1    Aug. 27, 2020

(30) Foreign Application Priority Data
Oct. 30, 2017    (JP) ................. 2017-209162

(51) Int. Cl.
*C08K 5/3415*    (2006.01)
*B29D 11/00*    (2006.01)
(Continued)

(52) U.S. Cl.
CPC .......... *C08K 5/3415* (2013.01); *B29C 55/005* (2013.01); *B29C 55/02* (2013.01);
(Continued)

(58) Field of Classification Search
CPC . B29D 11/00788; B29C 55/02; B29C 55/005; B29K 2029/04
See application file for complete search history.

(56) References Cited

U.S. PATENT DOCUMENTS

| | | | |
|---|---|---|---|
| 2005/0056815 A1 | 3/2005 | Miteva et al. | |
| 2008/0103279 A1 | 5/2008 | Heun et al. | |
| 2017/0157869 A1* | 6/2017 | Nam | ............... B29D 11/00894 |

FOREIGN PATENT DOCUMENTS

| | | |
|---|---|---|
| EP | 2 420 547 | 2/2012 |
| JP | 2005-49824 | 2/2005 |

(Continued)

OTHER PUBLICATIONS

WO 2016204301 Google Patents translation (2016, 27 pages).*
International Search Report dated Jan. 8, 2019 in International (PCT) Application No. PCT/JP2018/038959.

*Primary Examiner* — Brieann R Johnston
(74) *Attorney, Agent, or Firm* — Wenderoth, Lind & Ponack, L.L.P.

(57) ABSTRACT

Provided are a novel solid-based upconversion film having high emission efficiency and a method for producing the upconversion film. An upconversion film according to the present invention is a stretched film formed of a composition at least including an acceptor, a donor, and a matrix resin, wherein the matrix resin is a poly(vinyl alcohol)-based resin, and the matrix resin is oriented by stretching. A method for producing an upconversion film according to the present invention is a method for producing a photon upconversion film including a step of stretching a composition at least including an acceptor, a donor, and a matrix resin, wherein the matrix resin is a poly(vinyl alcohol)-based resin, and the stretching is wet-stretching in an aqueous solution of boric acid.

8 Claims, 4 Drawing Sheets

(51) Int. Cl.
  *C08J 5/18*    (2006.01)
  *C08K 5/06*    (2006.01)
  *B29C 55/00*   (2006.01)
  *B29C 55/02*   (2006.01)
  *C09K 11/06*   (2006.01)
  *B29K 29/00*   (2006.01)

(52) U.S. Cl.
  CPC ............ *B29D 11/00788* (2013.01); *C08J 5/18* (2013.01); *C08K 5/06* (2013.01); *C09K 11/06* (2013.01); *B29K 2029/04* (2013.01); *C08J 2329/04* (2013.01)

(56) References Cited

FOREIGN PATENT DOCUMENTS

| | | |
|---|---|---|
| JP | 2008-506798 | 3/2008 |
| JP | 2017-107174 | 6/2017 |
| JP | 2017-171699 | 9/2017 |
| WO | 2016/204301 | 12/2016 |

\* cited by examiner

PHOTON UPCONVERSION FILM AND METHOD FOR PRODUCING THE SAME

TECHNICAL FIELD

The present invention relates to a photon upconversion film that, in response to irradiation with excited light, emits light having a shorter wavelength than the excited light, and a method for producing the photon upconversion film.

BACKGROUND ART

A photon upconversion (hereafter, sometimes simply referred to as "upconversion") phenomenon of converting low-energy light to high-energy light is a unique phenomenon not usually observed. When this technique is put into practical use, compared with existing methods of using light, the technique is expected to be applied to other various fields (such as the solar cell field, the photocatalyst field, the bio-imaging field, and the optical apparatus field).

Upconversion emission is caused in organic materials by a known technique using triplet-triplet annihilation (TTA) upon collision between molecules in a triplet state.

Of such upconversion using TTA, solution-based upconversion in which donor molecules and acceptor molecules are dissolved in a solvent causes efficient energy transfer due to diffusion of donor molecules and acceptor molecules.

However, in the case of the solution-based, its practical use will be limited to some fields, and high potential of future applications to various fields is not provided.

Thus, high-efficiency upconversion emission in the solid state has also been researched.

However, molecules substantially do not diffuse in the solid state. Thus, studies have also been performed on mixing of molecules at high concentrations in the matrix to increase the probability of TTA for achieving the upconversion phenomenon. However, diffusion is limited, so that a considerable increase in the probability of TTA is not expected.

Under such circumstances, a method of using an MOF (metal organic framework) complex having an accurately controlled crystalline structure has also been proposed (for example, refer to Patent Literature 1).

CITATION LIST

Patent Literature

PTL 1: International Publication No. 2016/204301

SUMMARY OF INVENTION

Technical Problem

There is the following report on the above-described method using the MOF complex: regularly arranged molecules unique to the complex cause efficient transfer of triplet energy between molecules, to provide good upconversion characteristics.

However, it is very difficult to form a shaped article from such a very small MOF complex alone. When the MOF complex is combined with resin, the resultant material as a whole has very low efficiency.

Accordingly, on the basis of studies from another point of view, an object of the present invention is to provide a novel solid-based upconversion film having high emission efficiency, and a method for producing the upconversion film.

Solution to Problem

In order to achieve the object, the present invention has the following features.

Specifically, an upconversion film according to the present invention is a stretched film formed of a composition at least including an acceptor, a donor, and a matrix resin, wherein the matrix resin is a poly(vinyl alcohol)-based resin, and the matrix resin is oriented by stretching.

A method for producing an upconversion film according to the present invention is a method for producing a photon upconversion film including a step of stretching a composition at least including an acceptor, a donor, and a matrix resin, wherein the matrix resin is a poly(vinyl alcohol)-based resin, and the stretching is wet-stretching in an aqueous solution of boric acid.

Advantageous Effects of Invention

The present invention provides the following advantages: transfer of triplet energy from a donor to an acceptor efficiently occurs, and the film is provided as a solid-based film, which has a high potential of applications; in addition, the film can be simply produced.

DESCRIPTION OF EMBODIMENTS

[Mechanism of Upconversion]

The present invention uses the mechanism of upconversion based on triplet-triplet annihilation.

Figure 1:
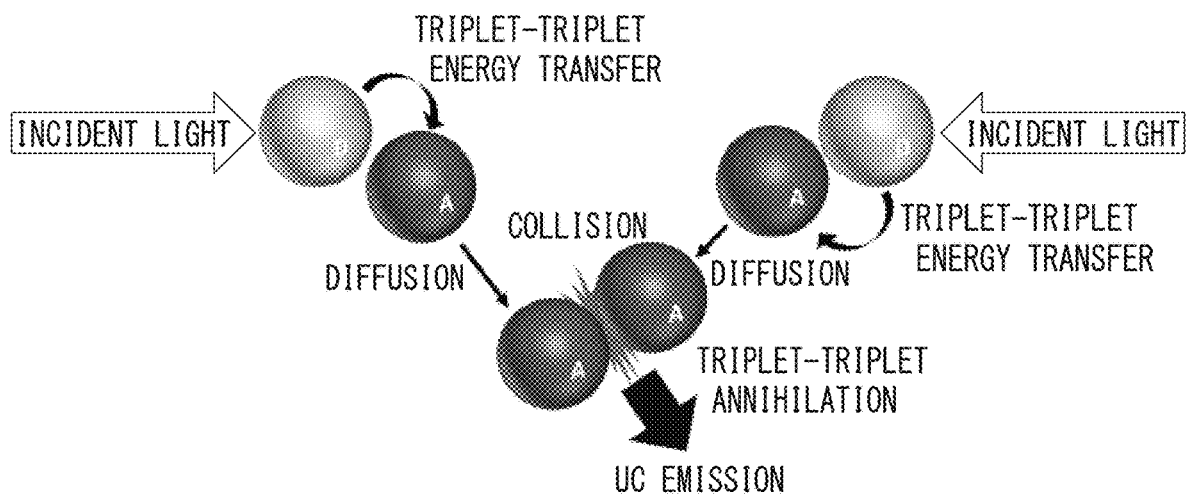
FIG. 1 is a schematic view of the mechanism of upconversion based on triplet-triplet annihilation.

This mechanism is illustrated in a schematic view in FIG. 1.

As illustrated in FIG. 1, donors absorb incident light, and intersystem crossing from the excited singlet state gives an excited triplet state.

Subsequently, triplet-triplet energy transfer occurs from the donors to acceptors, which results in an excited triplet state of the acceptors.

Subsequently, the acceptors in the excited triplet state diffuse and collide with each other, to cause triplet-triplet annihilation. This results in formation of an excited singlet at a higher energy level, which provides upconversion emission.

Such a mechanism itself is publicly known.

[Acceptor]

As is clear from the above-described mechanism, acceptors receive transfer of triplet-triplet energy from donors to generate an excited triplet state; acceptors in the excited triplet state diffuse and collide with each other, to cause triplet-triplet annihilation, to generate an excited singlet at a higher energy level.

As such acceptors, there are various known compounds having condensed aromatic rings. Preferred examples include compounds having a naphthalene structure, an anthracene structure, a pyrene structure, a perylene structure, a tetracene structure, or a Bodipy structure (borondipyrromethene structure).

In particular, as the compounds having an anthracene structure, 9,10-diphenylanthracene represented by the following Formula (1) and substitution products thereof are preferably employed.

[Chem. 1]

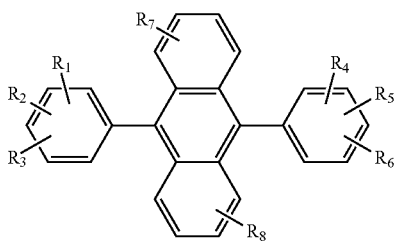

(1)

In Formula (1) above, $R_1$ to $R_8$ each independently represent a hydrogen atom, a halogen atom, a cyano group, an amino group having an optionally branched alkyl chain having 1 to 8 carbon atoms, an optionally branched alkyl group having 1 to 12 carbon atoms, an optionally branched alkoxy group having 1 to 12 carbon atoms, an ethylene oxide chain represented by the following Formula (2) or the following Formula (3), or an ammonium ion represented by the following Formula (4).

[Chem. 2]

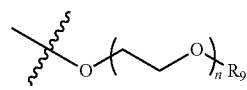

(2)

In Formula (2) above, $R_9$ represents an alkyl group having 1 to 3 carbon atoms, and n represents an integer of 1 to 4.

[Chem. 3]

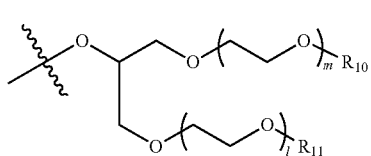

(3)

In Formula (3) above, $R_{10}$ and $R_{11}$ each independently represent an alkyl group having 1 to 3 carbon atoms, and m and l each independently represent an integer of 1 to 4.

[Chem. 4]

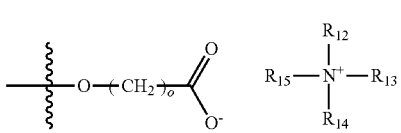

(4)

In Formula (4) above, o represents an integer of 1 to 8, and $R_{12}$ to $R_{15}$ each independently represent an optionally branched alkyl group having 1 to 6 carbon atoms.

The following are specific examples of the preferred compounds.

[Chem. 5]

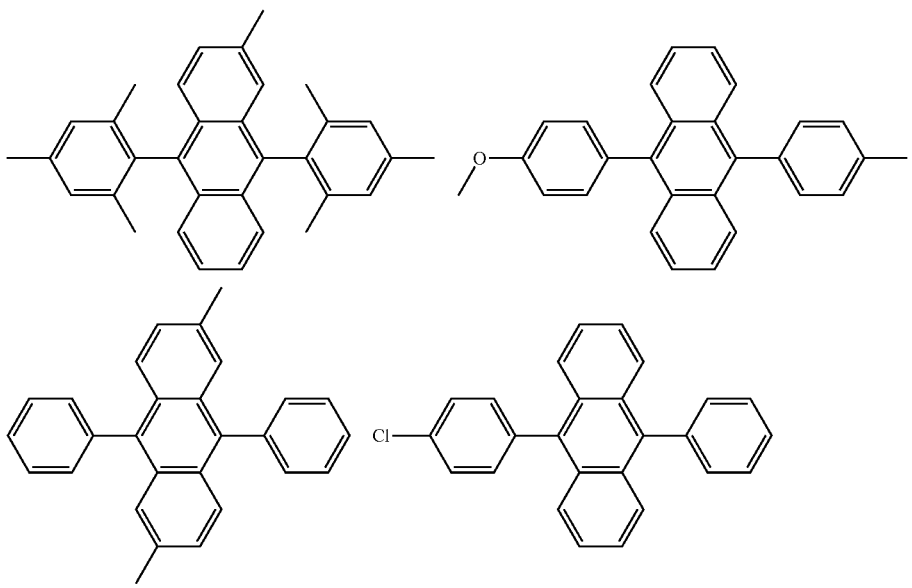

-continued
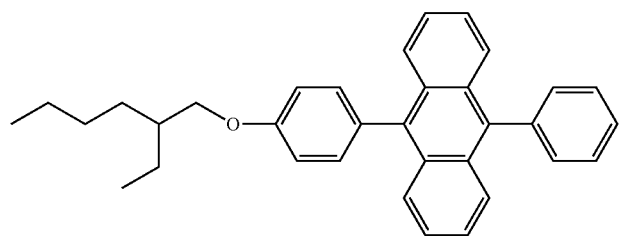
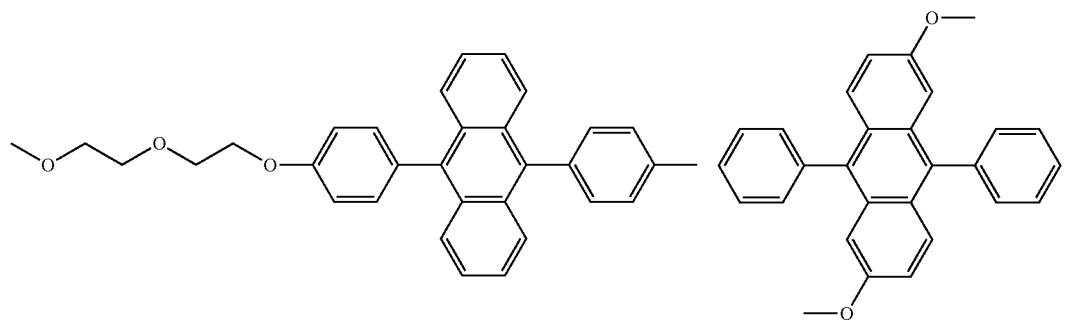
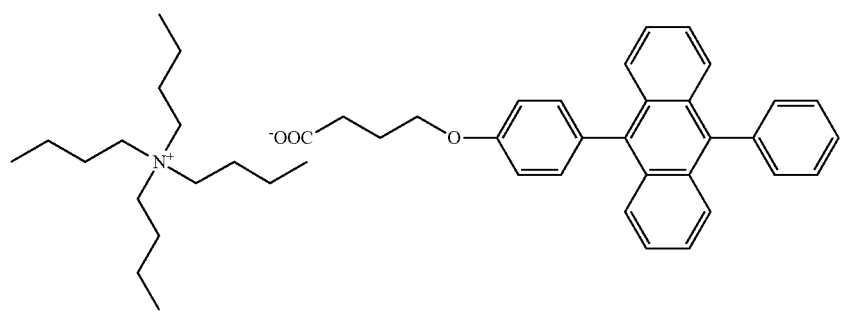
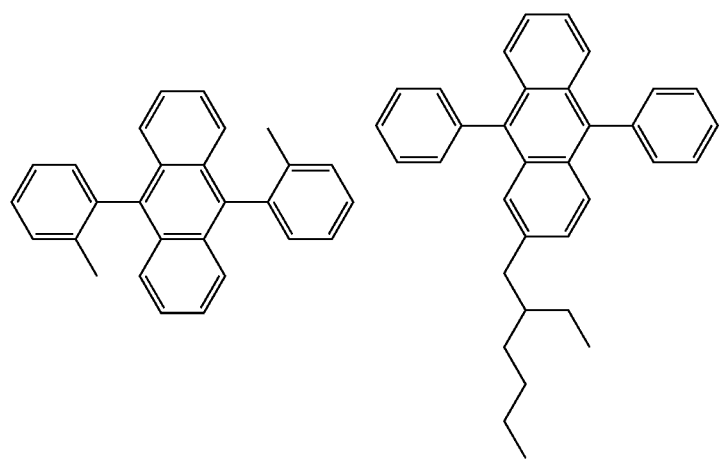
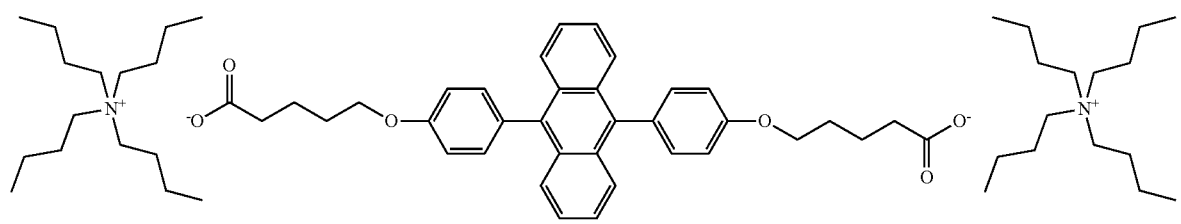

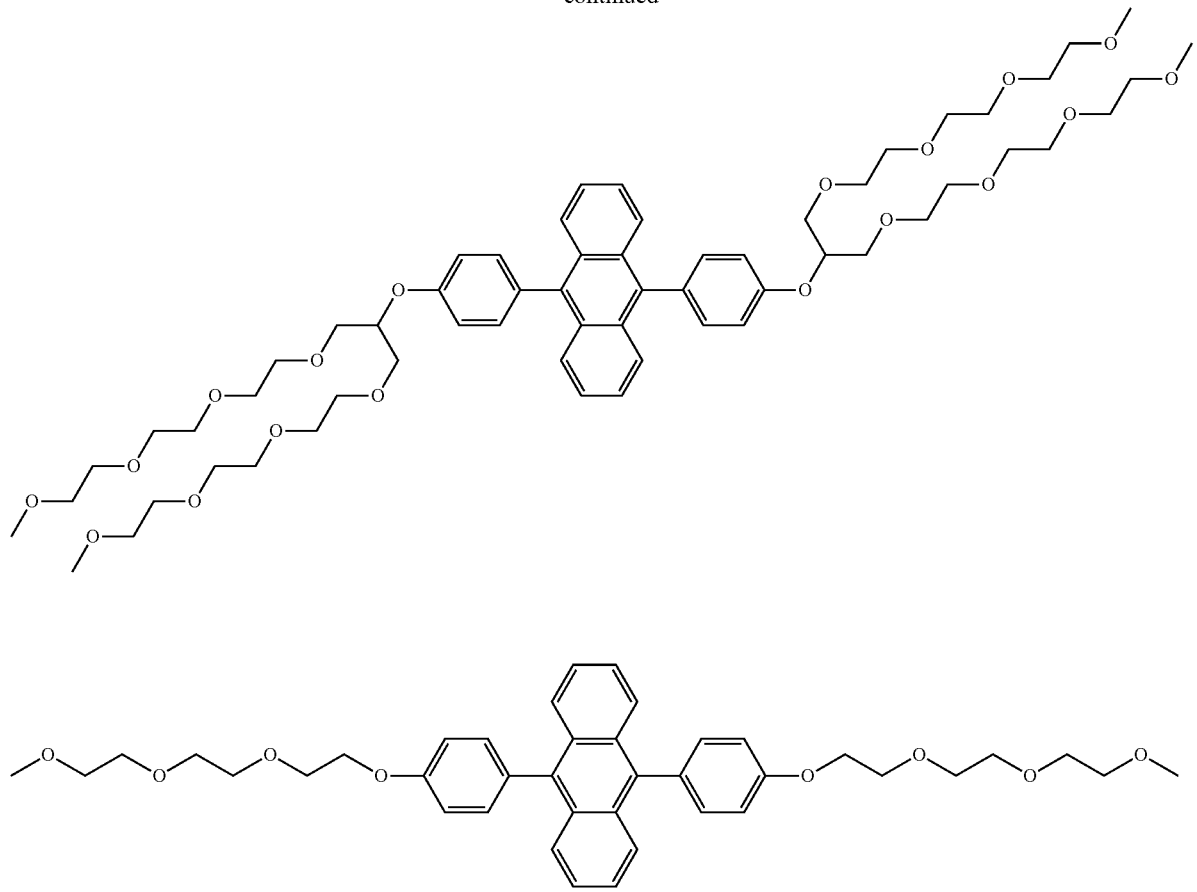

Acceptors having a hydrophilic group such as an alkoxy group, an alkylene oxide chain (such as an ethylene oxide chain or a propylene oxide chain), a hydroxy group, a carboxyl group, an amino group, or an ammonium ion have water-solubility, and hence are suitably used for wet-stretching.

Appropriate selection of, for example, the number of such a functional group or the length of the alkylene oxide chain enables control of the degree of water-solubility.

[Donor]

As is clear from the above-described mechanism, donors absorb incident light, undergo intersystem crossing from the excited singlet state into an excited triplet state, and cause triplet-triplet energy transfer to acceptors.

Preferred examples of such donors include donors having a porphyrin structure, a phthalocyanine structure, or a fullerene structure. Donors may have, in such a structure, a metal atom such as Pt, Pd, Zn, Ru, Re, Ir, Os, Cu, Ni, Co, Cd, Au, Ag, Sn, Sb, Pb, P, or As.

In particular, preferred is a compound having a porphyrin structure and represented by the following general formula (5).

[Chem. 5]

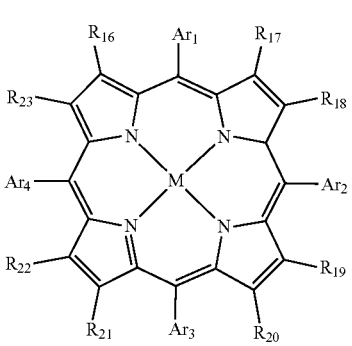

(5)

In Formula (5) above, $R_{16}$ to $R_{23}$ each independently represent a hydrogen atom, a halogen atom, a cyano group, an amino group having an optionally branched alkyl chain having 1 to 8 carbon atoms, an optionally branched alkyl group having 1 to 12 carbon atoms, an optionally branched alkoxy group having 1 to 12 carbon atoms, or an ethylene oxide chain represented by the following Formula (6); M represents a hydrogen atom, platinum, palladium, zinc, or copper; $Ar_1$ to $Ar_4$ each independently represent a hydrogen atom, a substituent represented by the following Formula (7), the following Formula (8), or the following Formula (9), or an ammonium ion represented by the following Formula (10).

[Chem. 7]

(6)

In Formula (6) above, $R_{24}$ represents an alkyl group having 1 to 3 carbon atoms, and p represents an integer of 1 to 4.

[Chem. 8]

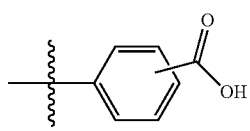
(7)

[Chem. 9]

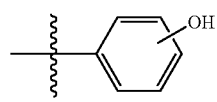
(8)

[Chem. 10]

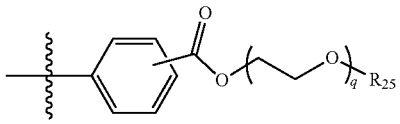
(9)

In Formula (9) above, $R_{25}$ represents an alkyl group having 1 to 3 carbon atoms, and q represents an integer of 1 to 4.

[Chem. 11]

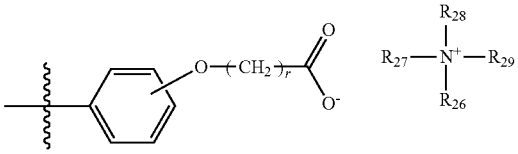
(10)

In Formula (10) above, r represents an integer of 1 to 8, and $R_{26}$ to $R_{29}$ each independently represent an optionally branched alkyl group having 1 to 6 carbon atoms.

The following are specific examples of the preferred compounds.

[Chem. 12]

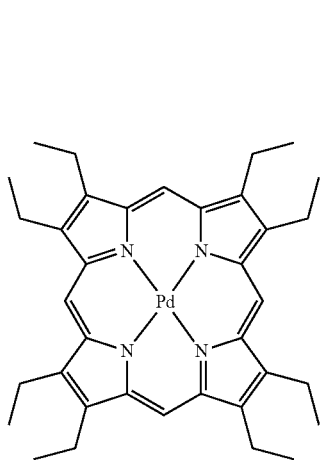
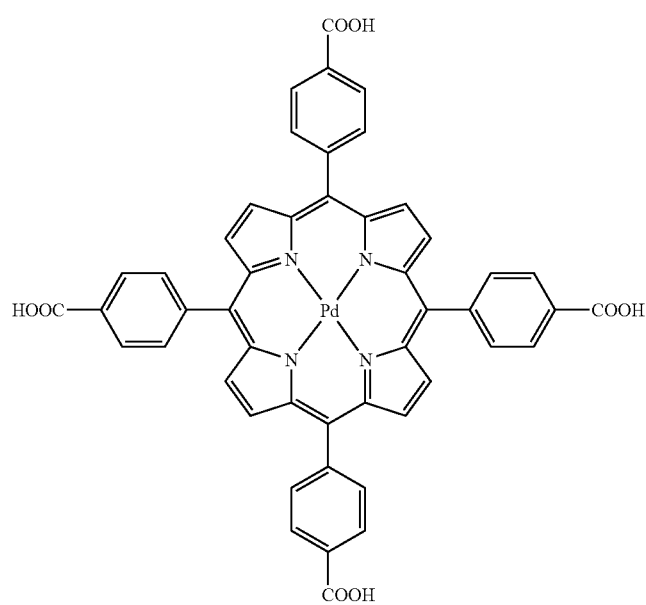

-continued

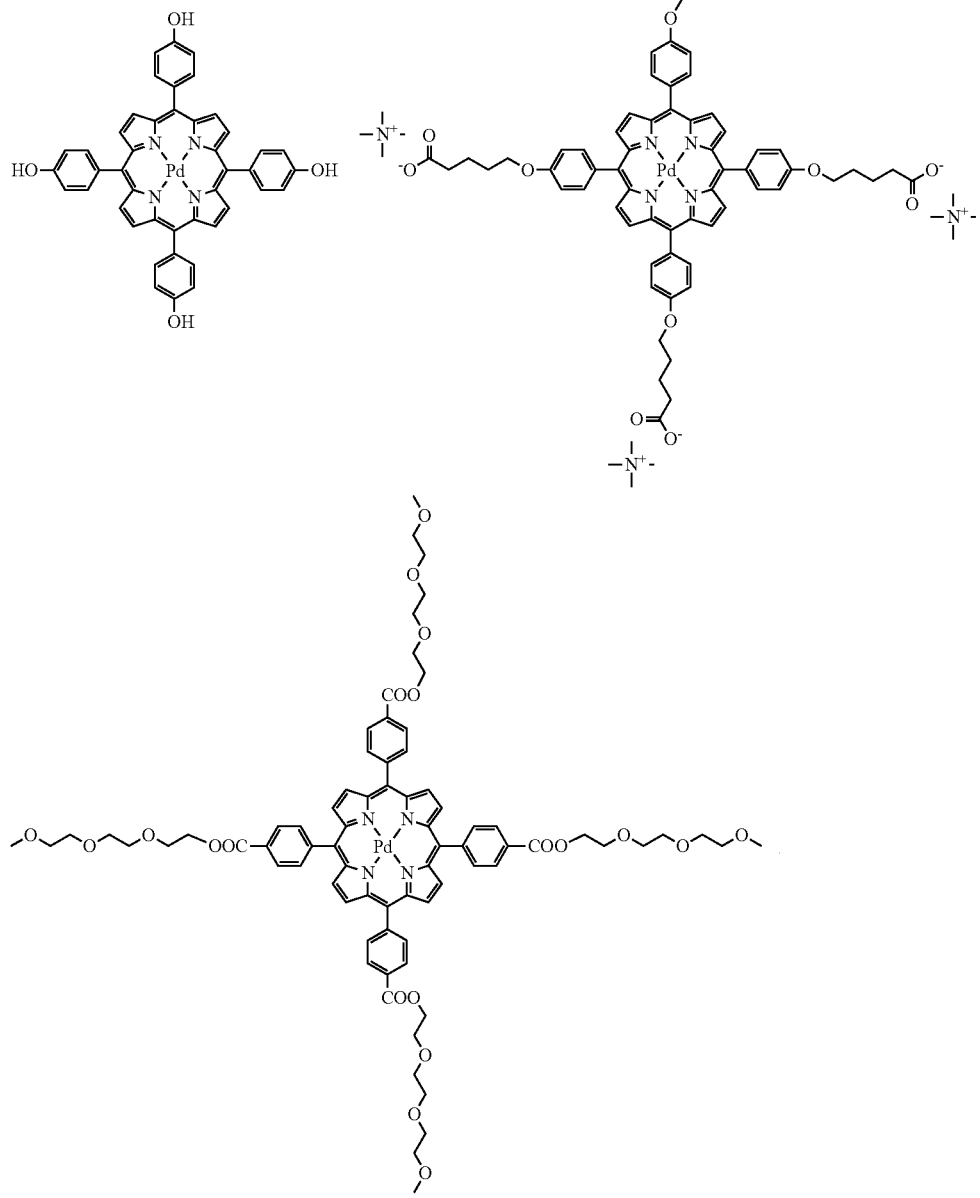

Donors having a hydrophilic group such as an alkoxy group, an alkylene oxide chain (such as an ethylene oxide chain or a propylene oxide chain), a hydroxy group, a carboxyl group, an amino group, or an ammonium ion have water-solubility, and hence are suitably used for wet-stretching.

Appropriate selection of, for example, the number of such a functional group or the length of the alkylene oxide chain enables control of the degree of water-solubility.

[Matrix Resin]

The matrix resin is used for providing, in a solid-based form, an upconversion phosphor including the above-described donor and acceptor; and a resin that provides, when including the donor and acceptor, a film that can be stretched is selected.

Examples of the matrix resin include poly(vinyl alcohol)-based resins, polyurethane-based resins, polystyrene-based resins, poly(methyl (meth)acrylate)-based resins, polycarbonate-based resins, and epoxy-based resins.

Such a term "-based" means the following: for example, the poly(vinyl alcohol)-based resin encompasses, in addition to poly(vinyl alcohol), copolymers of poly(vinyl alcohol) and another monomer such as a poly(vinyl alcohol)-polyethylene copolymer.

[Composition]

A composition according to the present invention at least includes the donor, the acceptor, and the matrix resin.

The donor, the acceptor, and the matrix resin are preferably selected to form a combination having high miscibility.

In particular, a preferred embodiment is as follows: as the donor and the acceptor, water-soluble compounds and/or salts thereof are used; and, as the matrix resin, a water-soluble resin is used in combination with the donor and the acceptor. Regarding such water-soluble materials, specific examples and the like are described above.

Use of such water-soluble materials enables wet-stretching, which is preferred for achieving a high stretch ratio. Details of stretching will be described later.

The mixing ratio of the donor in the composition relative to the total amount of the composition is preferably 0.0001 to 1 mass %.

The mixing ratio of the acceptor in the composition relative to the total amount of the composition is preferably 0.01 to 20 mass %.

The mixing ratio of the matrix resin in the composition relative to the total amount of the composition is preferably 79 to 99.9 mass %.

[Stretched Film]

An upconversion film according to the present invention is a stretched film formed of the above-described composition.

The method of stretching is not particularly limited, and may be fixed-edge stretching or free-edge stretching, but is preferably free-edge stretching. The reason for this is as follows: in free-edge stretching in which film edges are not fixed, the film shrinks in a direction (namely, the width direction) perpendicular to the stretching direction. Thus, the method is stretching without suppressing shrinkage, so that the stretching shortens the distance between main chains of the matrix resin, which results in orientation of molecules in the stretching direction. As a result, with an increase in the stretch ratio, the orientation function also increases.

The stretching method may be uniaxial stretching or biaxial stretching. However, uniaxial stretching of stretching in one direction alone is preferred because, in the present invention, stretching is performed for the technical purpose of orienting molecules to promote transfer of triplet energy.

The stretching may be performed in one step or multiple steps.

The stretching method may be wet-stretching of stretching a film in a stretching bath, or dry-stretching of stretching a film in the air, or both of them in combination.

Preferred is wet-stretching because stretching with a high stretch ratio can be achieved under relatively mild conditions.

The stretch ratio relative to the original length is preferably 2.0 or more, more preferably 4.0 or more.

In the case of performing stretching in multiple steps, the product among individual stretch ratios of the steps is the final stretch ratio of the stretched film.

The stretched film preferably has an orientation function of, for example, 0.05 or more, more preferably 0.19 or more. In general, probably under a certain upper limit, the higher the orientation function, the higher the expected efficiency of transfer of triplet energy due to orientation of molecules.

Studies by the inventors of the present invention have demonstrated that a method of using water-soluble materials as materials constituting the composition and performing wet-stretching is effective for stretching at a high stretch ratio.

The following has been found: in particular, in the case of using water-soluble compounds as the acceptor and the donor, using a poly(vinyl alcohol)-based resin as the matrix resin, and performing stretching by wet-stretching in an aqueous solution of boric acid, a high stretch ratio and a high orientation function are achieved. This provides a higher efficiency of transfer of triplet energy from the donor to the acceptor.

The thickness of the stretched film is not particularly limited, but is, for example, 20 to 40 μm.

EXAMPLES

Hereinafter, upconversion films and methods for producing the upconversion films according to the present invention will be described in detail with reference to Examples. However, the present invention is not limited to these Examples.

Synthesis Example 1: Synthesis of Acceptor A

Acceptor A was synthesized in accordance with the following synthesis scheme.

[Chem. 13]

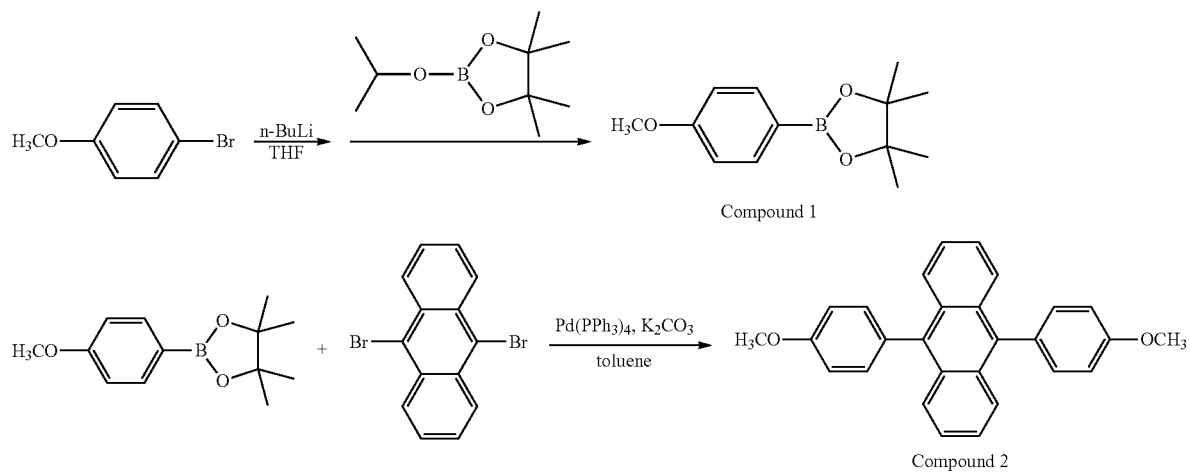

Compound 1

Compound 2

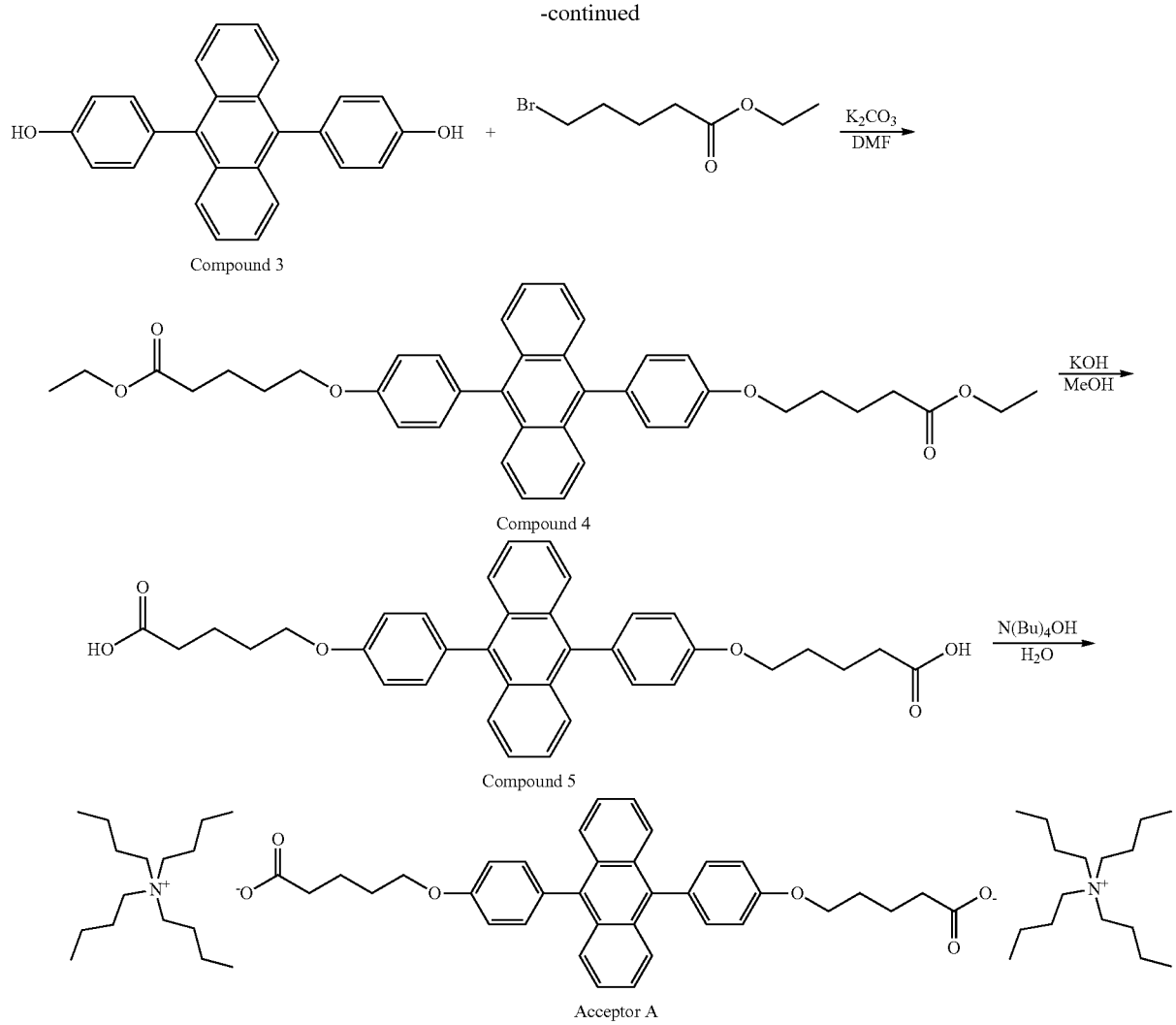

Compound 3

Compound 4

Compound 5

Acceptor A

Specific descriptions are as follows.

<Synthesis of Compound 1>

Under a nitrogen atmosphere, p-bromoanisole (1 g, 5.35 mmol) was added to dehydrated THF (20 ml) and stirred.

To the reaction solution under cooling at −78° C., 2.6 M n-butyllithium (2.3 ml, 5.89 mmol) was added dropwise, and a reaction was caused for 1 hour under cooling.

2-Isopropoxy-4,4,5,5-tetramethyl-1,3,2-dioxaborolane (1.19 ml, 5.89 mmol) was added, and a reaction was caused overnight at room temperature.

To the reaction solution, water was added, and extraction was performed with ethyl acetate.

Drying under a reduced pressure provides 1.03 g of a transparent liquid (yield: 82%).

$^1$H NMR (400 MHz, CDCl$_3$) δ: 7.75 (d, J=8.7 Hz, 2H), 6.89 (d, J=8.7 Hz, 2H), 3.82 (s, 3H), 1.31 (s, 12H)

<Synthesis of Compound 2>

Under a nitrogen atmosphere, Compound 1 (1.03 g, 4.4 mmol) and 9,10-dibromoanthracene (0.652 g, 1.94 mmol) were added to dehydrated toluene (20 ml) and stirred.

Tetrakis(triphenylphosphine)palladium(0) (0.11 g, 0.095 mmol) and a 2 M aqueous solution of potassium carbonate (7 ml) were added dropwise to the reaction solution, and a reaction was caused overnight.

Ethanol (5 ml) was added to the reaction solution, and a reaction was further caused overnight. To the reaction solution, water was added, and extraction was performed with ethyl acetate and chloroform.

Recrystallization with chloroform/methanol provides 0.736 g of pale yellow crystals (yield: 97%).

$^1$H NMR (400 MHz, CDCl$_3$) δ: 7.74 (m, 4H), 7.39 (d, J=8.7 Hz, 4H), 7.33 (m, 4H), 7.14 (d, J=8.7 Hz, 4H), 3.96 (s, 6H)

<Synthesis of Compound 3>

Under a nitrogen atmosphere, Compound 2 (0.65 g, 1.66 mmol) was added to dehydrated dichloromethane (150 ml) and stirred.

Under cooling at −78° C., 1 M boron tribromide (8.5 ml, 8.5 mmol) was added dropwise. After completion of the dropwise addition, stirring was performed for some time, and then a reaction was caused overnight at room temperature.

To ice water, the solution was added, and extraction was performed with chloroform and ethyl acetate.

Drying under a reduced pressure provides 0.533 g of a pale yellow solid (yield: 88%).

$^1$H NMR (400 MHz, DMSO) δ: 9.74 (s, 1H), 7.65 (m, 2H), 7.39 (m, 2H), 7.23 (d, J=8.5 Hz, 2H), 7.03 (d, J=8.5 Hz, 2H)

<Synthesis of Compound 4>

Compound 3 (0.150 g, 0.414 mmol) and potassium carbonate (0.171 g, 0.124 mmol) were added to N,N-dimethylformamide (DMF) (5 ml), and stirred at 80° C.

To the reaction solution, ethyl bromovalerate (0.259 g, 1.24 mmol) was added dropwise, and a reaction was caused overnight.

After the reaction was complete, the reaction solution was returned to room temperature, added to water, and filtered to obtain the precipitated solid.

The obtained solid was recrystallized with ethyl acetate/hexane.

Pale yellow crystals (0.190 g) were obtained (yield: 74%).

$^1$H NMR (400 MHz, CDCl$_3$) δ: 7.77-7.70 (m, 4H), 7.37 (d, J=8.7 Hz, 4H), 7.36-7.30 (m, 4H), 7.12 (d, J=8.7 Hz, 4H), 4.21-4.09 (m, 9H), 2.46 (br t, J=7.0 Hz, 4H), 2.01-1.84 (m, 8H), 1.57 (s, 6H), 1.29 (t, J=7.2 Hz, 6H)

<Synthesis of Compound 5>

Compound 4 (0.150 g, 0.242 mmol) was stirred in methanol (10 ml).

Subsequently, a 1 M aqueous solution of potassium hydroxide (5 ml) was added dropwise, and a reaction was caused at 80° C. overnight.

After the reaction was complete, the reaction solution was returned to room temperature, added to water, and turned acidic with dilute hydrochloric acid. The precipitated solid was obtained by filtration.

Drying under a reduced pressure provided 0.11 g of pale yellow crystals (yield: 81%).

$^1$H NMR (400 MHz, DMSO) δ: 12.40-11.81 (m, 2H), 7.67-7.61 (m, 4H), 7.43-7.39 (m, 4H), 7.35 (d, J=8.6 Hz, 4H), 7.20 (d, J=8.7 Hz, 4H), 4.13 (t, J=6.2 Hz, 4H), 2.36 (t, J=7.3 Hz, 4H), 1.95-1.62 (m, 8H)

<Synthesis of Acceptor A>

Compound 5 (0.100 g, 0.178 mmol) was added to water (20 ml) and stirred.

Subsequently, to the reaction solution, a 10% aqueous solution of tetrabutylammonium hydroxide (0.83 ml) was added dropwise.

A reaction was caused at room temperature for 2 hours, and then filtration was performed.

Drying of the filtrate under a reduced pressure provided 0.22 g of a pale yellow solid (yield: 100%).

$^1$H NMR (400 MHz, CD$_3$OD) δ: 7.70-7.64 (m, 4H), 7.34-7.23 (m, 8H), 7.15 (d, J=8.6 Hz, 4H), 4.14 (t, J=6.1 Hz, 4H), 3.24-3.16 (m, 16H), 2.30 (t, J=7.2 Hz, 4H), 1.96-1.82 (m, 8H), 1.69-1.57 (m, 17H), 1.39 (sxt, J=7.4 Hz, 17H), 1.00 (t, J=7.3 Hz, 24H)

Synthesis Example 2: Synthesis of Acceptor B

Acceptor B was synthesized in accordance with the following synthesis scheme.

[Chem. 14]

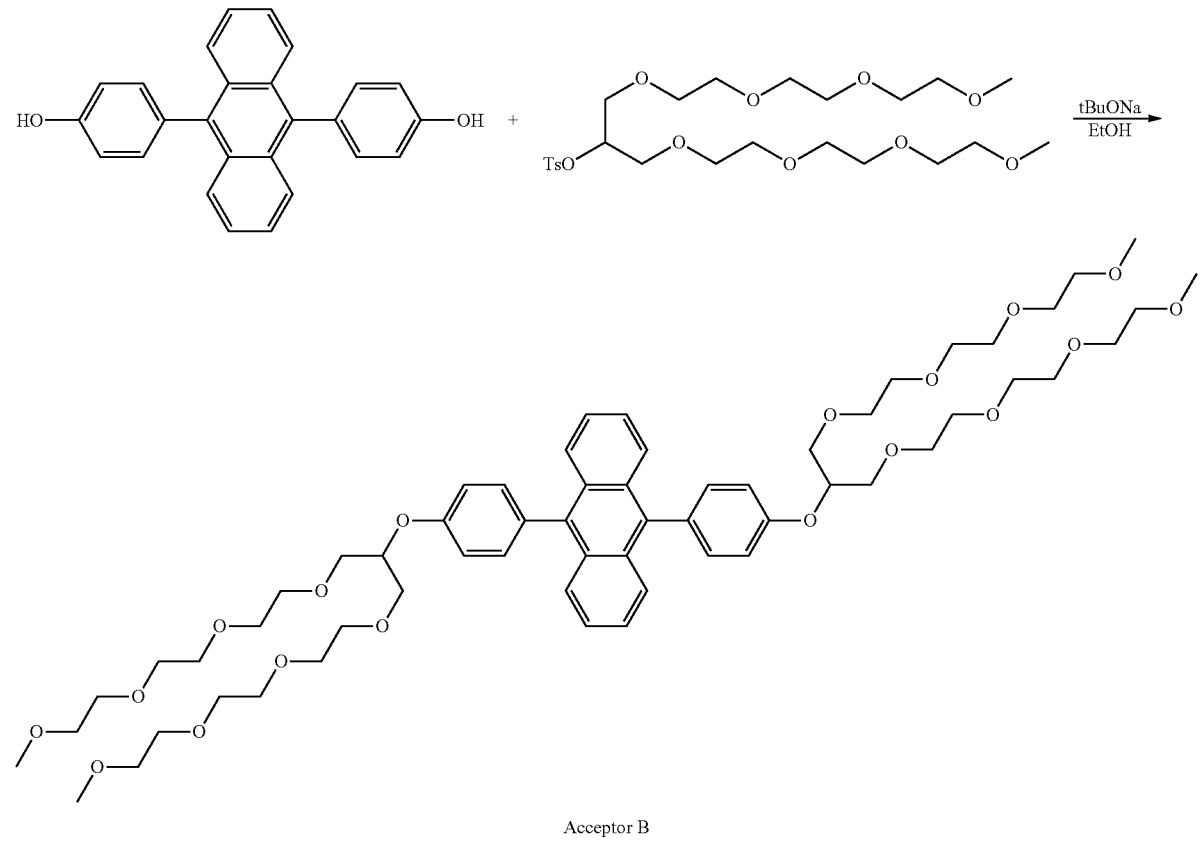

Acceptor B

Specific descriptions are as follows.

Under a nitrogen atmosphere, Compound 3 (0.100 g, 0.276 mmol) and t-butoxy sodium (0.0583 g, 0.607 mmol) were added to dehydrated ethanol (5 ml), and stirred at 80° C.

Subsequently, 1,3-bis(2-(2-(2-methoxyethoxy)ethoxy)ethoxy)propan-2-yl-toluene sulfonate (0.327 g, 0.607 mmol) was added dropwise, and a reaction was caused for 3 days.

After the reaction was complete, the reaction solution was returned to room temperature, added to ethyl acetate, extracted with water, and then purified with a silica gel column (ethyl acetate:methanol=50:1).

A pale yellow liquid (0.100 g) was obtained (yield: 33%).

$^1$H NMR (400 MHz, CDCl$_3$) δ: 7.77-7.71 (m, 4H), 7.39-7.30 (m, 8H), 7.21 (d, J=8.8 Hz, 4H), 4.78-4.64 (m, 2H), 3.89-3.82 (m, 7H), 3.79-3.73 (m, 8H), 3.73-3.61 (m, 32H), 3.58-3.50 (m, 8H), 3.36 (s, 12H)

Synthesis Example 3: Synthesis of Acceptor C

Acceptor C was synthesized in accordance with the following synthesis scheme.

[Chem. 15]

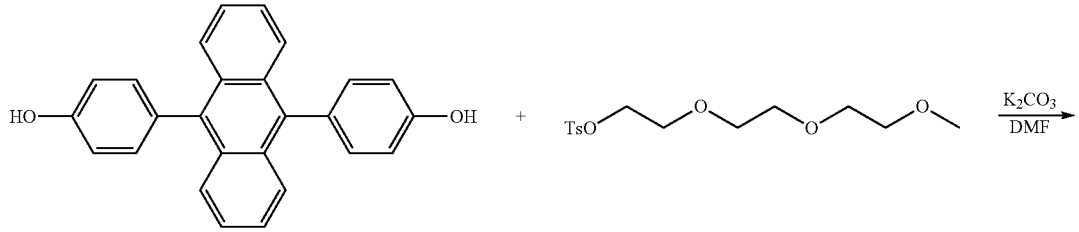

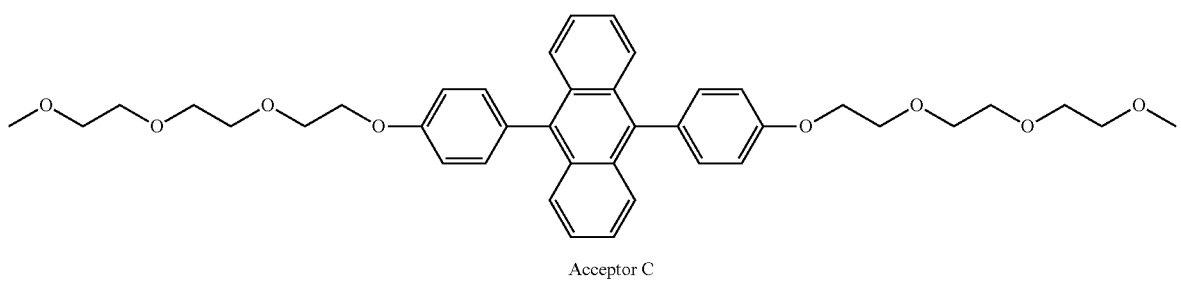

Acceptor C

Specific descriptions are as follows.

Compound 3 (0.150 g, 0.414 mmol) and potassium carbonate (0.144 g, 1.04 mmol) were added to N,N-dimethylformamide (DMF) (10 ml), and stirred at 80° C.

To the reaction solution, 2-(2-(2-methoxyethoxy) ethoxy) ethyl 4-methylbenzene sulfonate (0.331 g, 1.04 mmol) was added dropwise, and a reaction was caused overnight.

After the reaction was complete, the reaction solution was returned to room temperature, added to water, and the precipitated solid was obtained by filtration.

The obtained solid was recrystallized with ethyl acetate/hexane.

Pale yellow crystals (0.220 g) were obtained (yield: 81%).
$^1$H NMR (400 MHz, CDCl$_3$) δ: 7.75-7.70 (m, 4H), 7.37 (d, J=8.6 Hz, 4H), 7.36-7.30 (m, 5H), 7.15 (d, J=8.8 Hz, 4H), 4.33-4.26 (m, 4H), 4.01-3.93 (m, 4H), 3.86-3.79 (m, 4H), 3.77-3.69 (m, 8H), 3.66-3.53 (m, 4H), 3.41 (s, 6H)

Synthesis Example 4: Synthesis of Donor A

A donor was synthesized in accordance with the following synthesis scheme.

[Chem. 16]
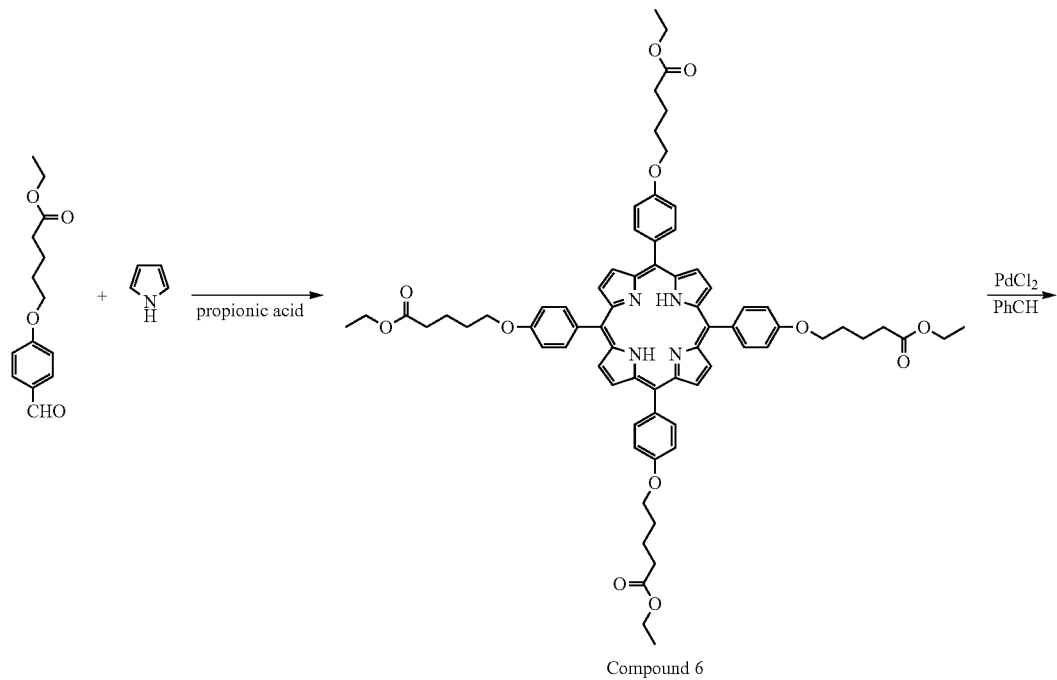
Compound 6
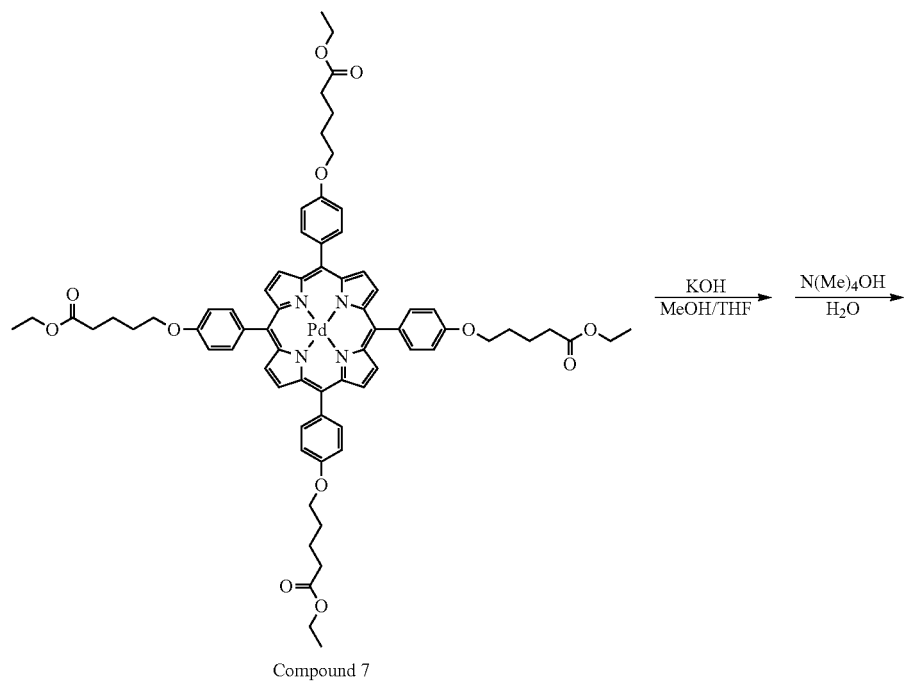
Compound 7

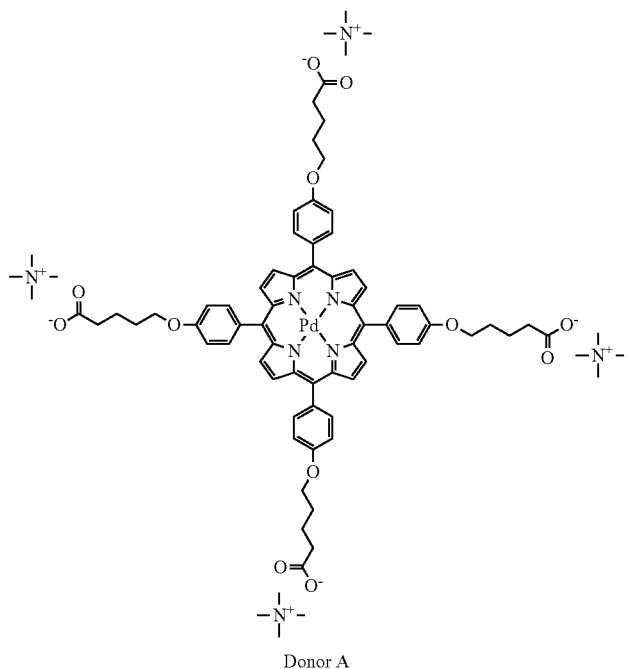

Donor A

Specific descriptions are as follows.

<Synthesis of Compound 6>

Ethyl-5-(4-formylphenoxy)pentanoate (4.00 g, 16.0 mmol) and pyrrole (1.18 ml, 17.0 mmol) were added to propionic acid (160 ml), and refluxed for 2 hours.

After the reaction was complete, the reaction solution was returned to room temperature, added to water, and filtered to obtain the precipitated solid.

A purple solid (0.4 g) was obtained (yield: 8%).

$^1$H NMR (400 MHz, CD$_2$Cl$_2$) δ: 8.92 (s, 8H), 8.15 (d, J=8.7 Hz, 8H), 7.33 (d, J=8.7 Hz, 8H), 4.32 (s, 8H), 4.21 (d, J=7.2 Hz, 8H), 2.54 (t, J=7.2 Hz, 8H), 2.13-1.95 (m, 16H), 1.34 (t, J=7.2 Hz, 12H)

<Synthesis of Compound 7>

Compound 6 (0.0352 g, 0.0295 mmol) was added to benzonitrile (40 ml) and dissolved.

Subsequently, palladium chloride (0.0105 g, 0.0590 mmol) was added and reflux was performed for 5 hours.

After the reaction was complete, the system was returned to room temperature, and the solvent was removed under a reduced pressure.

The obtained solid was recrystallized in ethyl acetate, to obtain 0.03 g of red crystals. The obtained compound was directly used for the next reaction.

<Synthesis of Donor A>

Compound 7 (0.0200 g, 0.0154 mmol) was added to methanol/tetrahydrofuran (3 ml/3 ml). To this, a 1 M aqueous solution of potassium hydroxide (3 ml) was added, and reflux was performed for 2 days.

Subsequently, neutralization was performed with 1 M hydrochloric acid, to obtain a red solid.

The obtained solid was dried, and then added to water. To this, a 10 mass % aqueous solution of tetramethylammonium hydroxide (0.485 ml) was added, and stirred at room temperature for 1 hour.

After the reaction, the solvent was removed under a reduced pressure. The obtained solid was washed with dichloromethane.

A red solid (0.017 g) was obtained (yield: 74%).

$^1$H NMR (400 MHz, CD$_3$OD) δ; 8.80 (s, 7H), 7.99 (d, J=8.6 Hz, 8H), 7.28 (d, J=8.7 Hz, 8H), 4.81 (s, 192H), 4.34-4.15 (m, 8H), 2.37-2.28 (m, 8H), 2.02-1.84 (m, 16H)

Synthesis Example 5: Synthesis of Donor B

A donor was synthesized in accordance with the following synthesis scheme.

[Chem. 17]
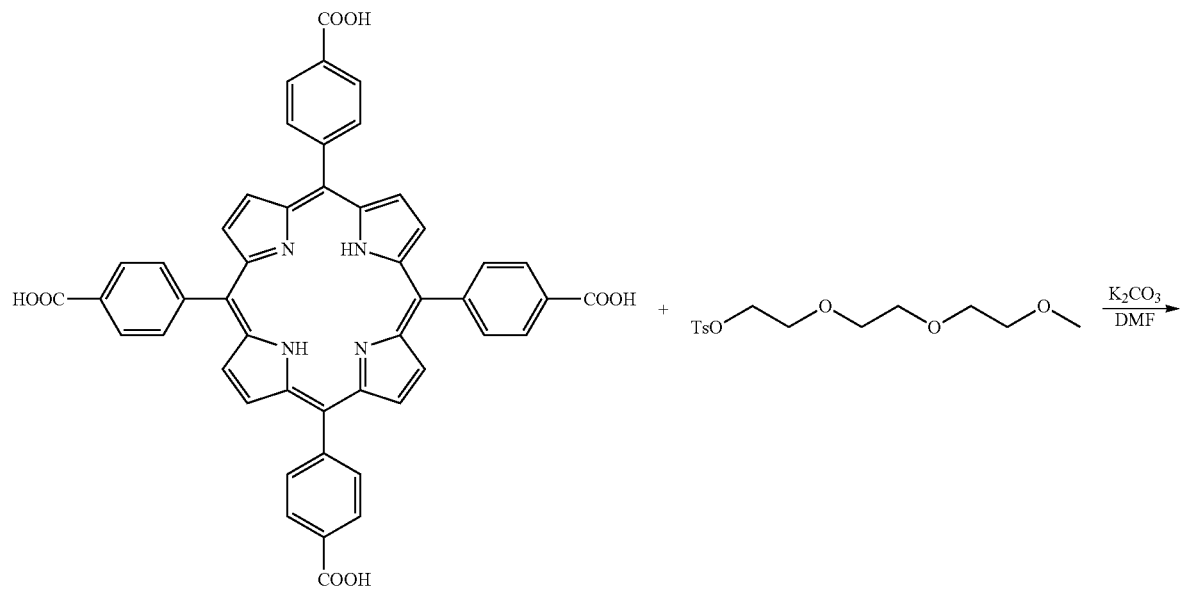
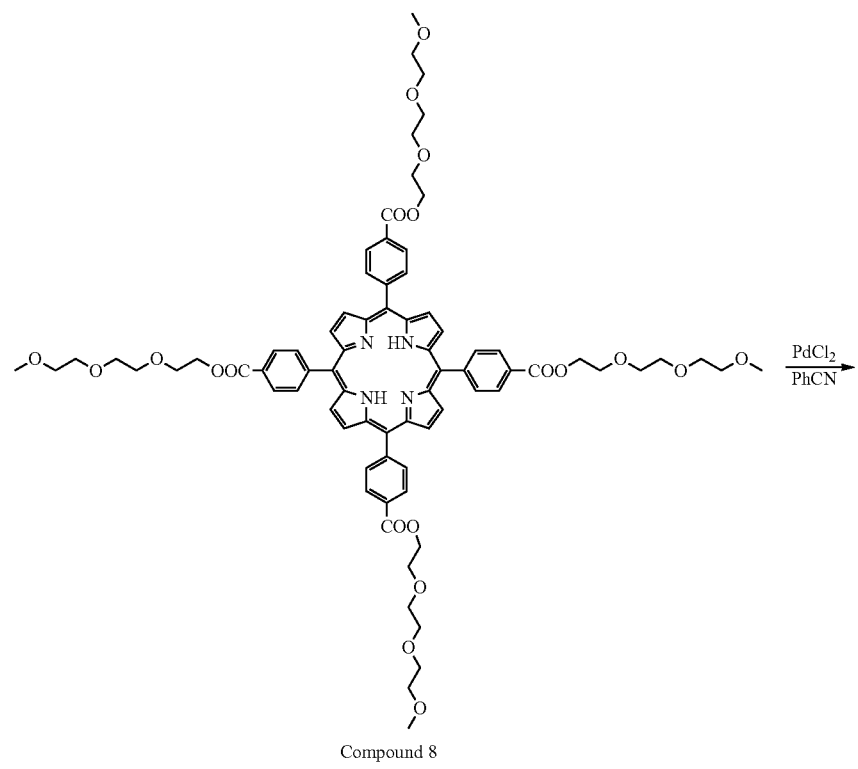
Compound 8

-continued

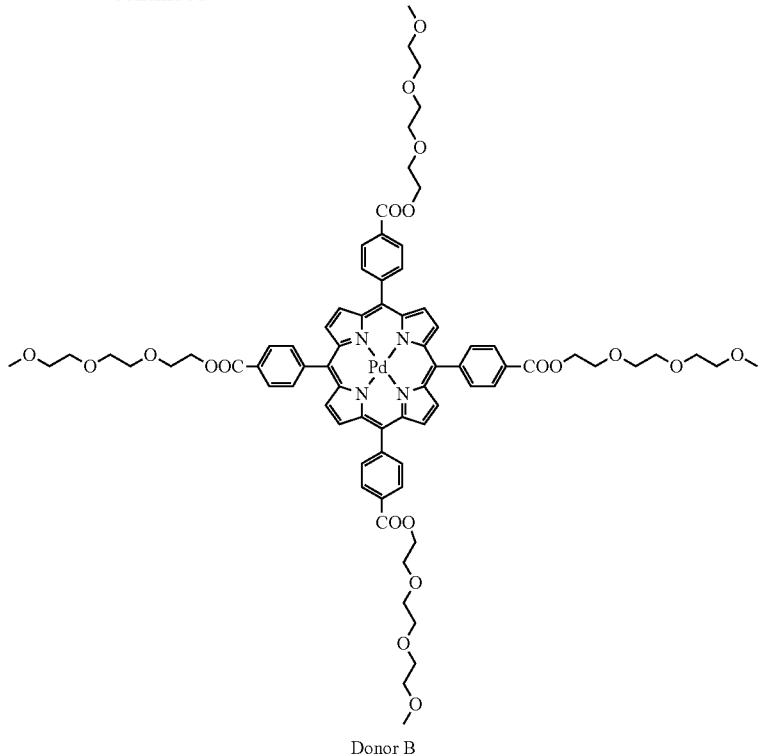

Donor B

Specific descriptions are as follows.

<Synthesis of Compound 8>

Tetrakis(4-carboxyphenyl)porphyrin (0.0700 g, 0.0885 mmol) and potassium carbonate (0.0979 g, 0.124 mmol) were added to N,N-dimethylformamide (DMF) (15 ml), and stirred at 80° C.

To the reaction solution, 2-(2-(2-methoxyethoxy) ethoxy) ethyl 4-methylbenzene sulfonate (0.169 g, 0.531 mmol) was added dropwise, and a reaction was caused for 1 day.

After the reaction was complete, the reaction solution was returned to room temperature, added to ethyl acetate, extracted with water, and then washed with acetone and hexane to obtain 0.05 g of a purple solid (yield: 41%).

$^1$H NMR (400 MHz, $(CD_3)_2CO$) δ: 9.27-8.62 (m, 8H), 8.54-8.42 (m, 8H), 8.42-8.31 (m, 8H), 4.73-4.54 (m, 8H), 4.07-3.90 (m, 8H), 3.75 (s, 8H), 3.70-3.60 (m, 16H), 3.53-3.47 (m, 8H), 3.29 (s, 12H)

<Synthesis of Donor B>

Compound 6 Compound 8 (0.0300 g, 0.0218 mmol) was added to benzonitrile (10 ml), and dissolved.

Subsequently, palladium chloride (0.00773 g, 0.0436 mmol) was added, and reflux was performed overnight.

After the reaction was complete, the system was returned to room temperature. The solvent was removed under a reduced pressure.

The obtained solid was washed with acetone and hexane to obtain 0.025 g thereof (yield: 77%).

$^1$H NMR (400 MHz, $CD_2Cl_2$) δ: 8.74 (s, 8H), 8.36 (d, J=7.5 Hz, 8H), 8.19 (d, J=7.5 Hz, 8H), 4.54 (dd, J=4.0, 5.5 Hz, 9H), 3.93-3.78 (m, 8H), 3.71-3.63 (m, 8H), 3.62-3.52 (m, 16H), 3.49-3.38 (m, 8H), 3.25 (s, 12H)

Example 1

Relative to 100 parts by mass of a 10 mass % aqueous solution of poly(vinyl alcohol), 0.001 parts by mass of Donor A obtained in Synthesis Example 4 and 0.5 parts by mass of Acceptor A obtained in Synthesis Example 1 were added, and mixed and stirred.

The resultant material was defoamed for 30 minutes, and then applied onto a glass plate.

After being dried at 90° C. for 15 minutes, the film was released from the glass plate to obtain an unstretched film.

The unstretched film was subjected to, in a 3 mass % aqueous solution of boric acid, uniaxial stretching in the longitudinal direction while both edges of the film were gripped (stretch ratio: 4).

Subsequently, the film was dried at 60° C. for 5 minutes, to provide the stretched film of Example 1.

Example 2

The same procedures as in Example 1 were performed except that the stretch ratio was set to 2, to obtain the stretched film of Example 2.

Comparative Example 1

The unstretched film prior to stretching in Example 1 was defined as Comparative Example 1.

Example 3

The same procedures as in Example 1 were performed except that 0.5 parts by mass of Acceptor A was replaced by 0.5 parts by mass of Acceptor B obtained in Synthesis Example 2, to obtain the stretched film of Example 3.

Comparative Example 2

The unstretched film prior to stretching in Example 3 was defined as Comparative Example 2.

Example 4

The same procedures as in Example 1 were performed except that 0.5 parts by mass of Acceptor A was replaced by 0.5 parts by mass of Acceptor C obtained in Synthesis Example 3, and the stretch ratio was set to 6, to obtain the stretched film of Example 4.

Comparative Example 3

The unstretched film prior to stretching in Example 4 was defined as Comparative Example 3.

Example 5

The same procedures as in Example 1 were performed except that 0.001 parts by mass of Donor A was replaced by 0.001 parts by mass of Donor B obtained in Synthesis Example 5, and the stretch ratio was set to 6, to obtain the stretched film of Example 5.

Comparative Example 4

The unstretched film prior to stretching in Example 5 was defined as Comparative Example 4.

[Measurement of Upconversion Emission Characteristics]

Each of the films obtained above in Examples 1 to 5 and Comparative Examples 1 to 4 was irradiated with a laser beam from a light source (532 nm, CW laser, 260 mW/cm$^2$ (in the air)) manufactured by Laser Create Corporation, and the resultant emission was measured with a spectroscope (QE65000, manufactured by Ocean Optics, Inc.). In order to avoid direct entry from the incident light source (532 nm) into the spectroscope, a notch filter (#86-120, manufactured by Edmund Optics Japan Ltd.) was disposed immediately before the spectroscope.

[Measurement of Degree of Orientation]

Each of the films obtained above in Examples 1 to 5 and Comparative Examples 1 to 4 was measured for infrared absorption spectra in terms of a case where the stretching direction was parallel to the infrared incident direction and a case where the stretching direction was perpendicular to the infrared incident direction, using a Fourier transform infrared spectrophotometer (FT/IR-4700, manufactured by JASCO Corporation) equipped with an ATR measurement attachment (ATR PRO610P-S (ZnSe prism), manufactured by JASCO Corporation) to which a polarizing filter was inserted. In the obtained spectra, from the intensities of the peaks at 1325 cm$^{-1}$, a ratio of the intensity in the perpendicular direction to the intensity in the parallel direction was determined to calculate the orientation function.

[Results and Discussion]

The peak-value ratio of upconversion emission obtained from the acceptor and in the shorter wavelength region relative to 532 nm of the excited light to phosphorescence emission obtained from the donor and in the longer wavelength region was determined for each of the stretch ratios, to thereby verify the effect provided by stretching.

Figure 2:
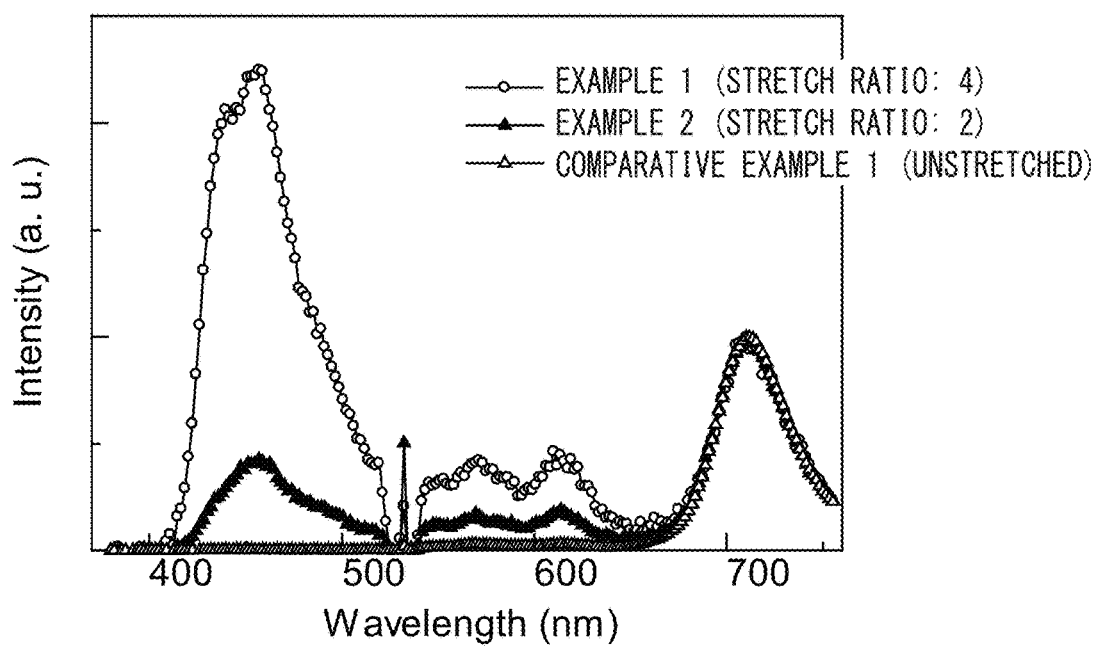
FIG. 2 is a graph illustrating emission characteristics of films according to Examples 1 and 2 and Comparative Example 1.

The results of Examples 1 and 2 and Comparative Example 1 are summarized in FIG. 2.

The following Table 1 summarizes the intensities at 457 nm relative to the peaks at 710 nm in the films of Examples 1 and 2 and Comparative Example 1.

TABLE 1

| | Stretch ratio | Spectrum intensity ratio 457 (nm) | Spectrum intensity ratio 710 (nm) | Orientation function |
|---|---|---|---|---|
| Example 1 | 4 | 2.2 | 1 | 0.27 |
| Example 2 | 2 | 0.4 | 1 | 0.06 |
| Comparative Example 1 | Unstretched | 0 | 1 | −0.01 |

The results have demonstrated that, in the case of being unstretched, upconversion emission substantially does not occur, whereas, in the case of being stretched, upconversion emission tends to occur. This tendency becomes strong with an increase in the stretch ratio.

The results suggest that stretching orients upconversion emission molecules, which provides efficient transfer of triplet energy.

Figure 3:
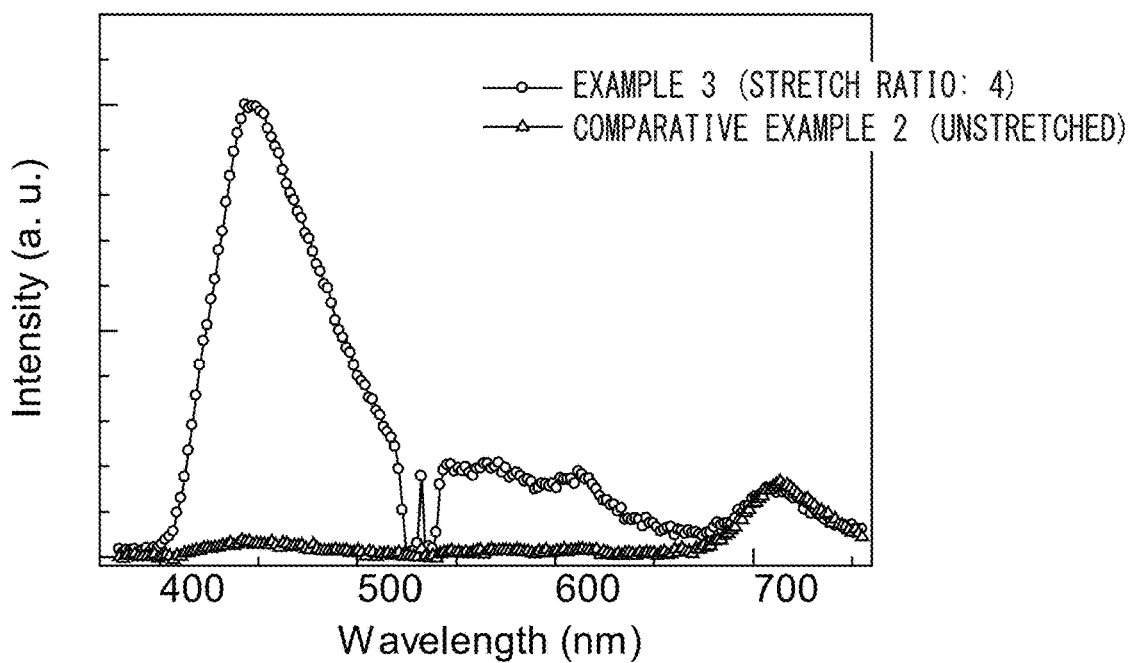
FIG. 3 is a graph illustrating the emission characteristics of films according to Example 3 and Comparative Example 2.

The results of Example 3 and Comparative Example 2 are summarized in FIG. 3.

The following Table 2 summarizes the intensities at 450 nm relative to the peaks at 710 nm in the films of Example 3 and Comparative Example 2.

TABLE 2

| | Stretch ratio | Spectrum intensity ratio 450 (nm) | Spectrum intensity ratio 710 (nm) | Orientation function |
|---|---|---|---|---|
| Example 3 | 4 | 5.7 | 1 | 0.19 |
| Comparative Example 2 | Unstretched | 0.3 | 1 | 0.02 |

Figure 4:
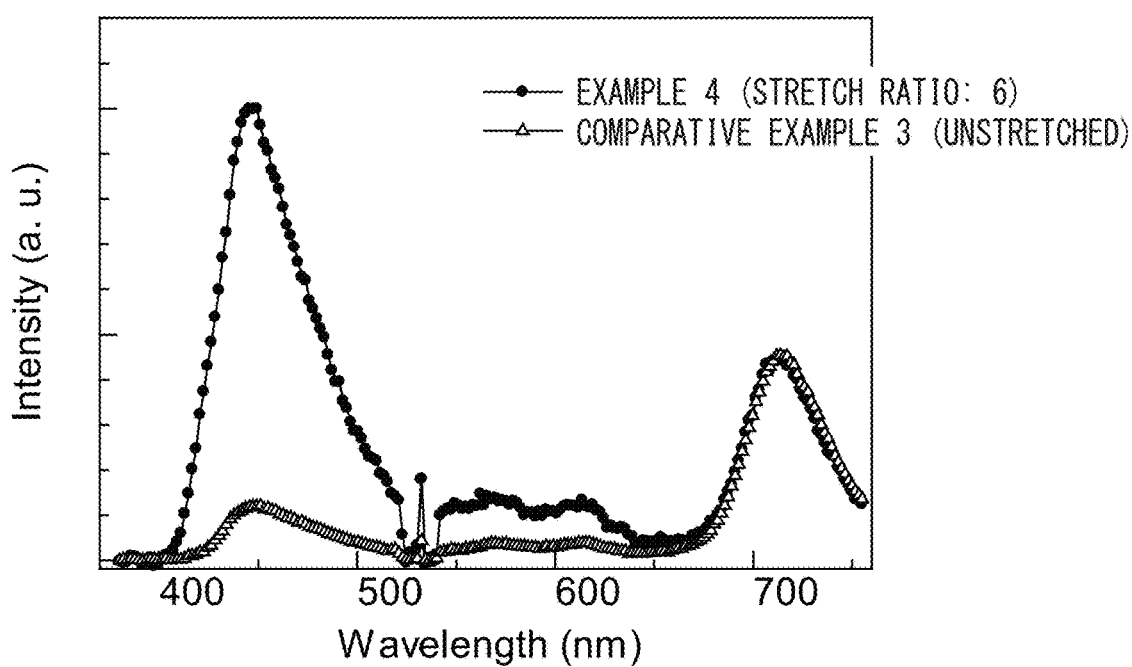
FIG. 4 is a graph illustrating the emission characteristics of films according to Example 4 and Comparative Example 3.

The results of Example 4 and Comparative Example 3 are summarized in FIG. 4.

The following Table 3 summarizes the intensities at 446 nm relative to peaks at 710 nm in the films of Example 4 and Comparative Example 3.

TABLE 3

| | Stretch ratio | Spectrum intensity ratio 446 (nm) | Spectrum intensity ratio 710 (nm) | Orientation function |
|---|---|---|---|---|
| Example 4 | 6 | 2.3 | 1 | 0.35 |
| Comparative Example 3 | Unstretched | 0.3 | 1 | 0.03 |

Figure 5:
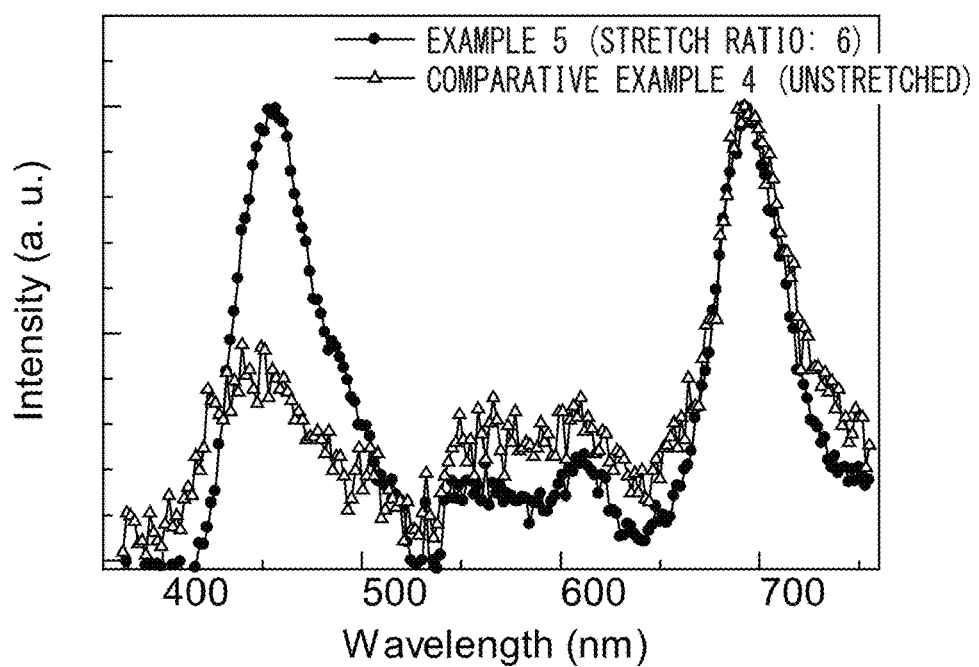
FIG. 5 is a graph illustrating the emission characteristics of films according to Example 5 and Comparative Example 4.

The results of Example 5 and Comparative Example 4 are summarized in FIG. 5.

The following Table 4 summarizes the intensities at 457 nm relative to the peaks at 693 nm in the films of Example 5 and Comparative Example 4.

TABLE 4

| | Stretch ratio | Spectrum intensity ratio 457 (nm) | Spectrum intensity ratio 693 (nm) | Orientation function |
|---|---|---|---|---|
| Example 5 | 6 | 1.0 | 1 | 0.25 |
| Comparative Example 4 | Unstretched | 0.4 | 1 | 0.01 |

The results of Examples 2 to 5 and Comparative Examples 2 to 4 have demonstrated that, even in the cases of changing the species of the donor or acceptor, stretching also provides markedly improved upconversion emission characteristics.

Figure 6:
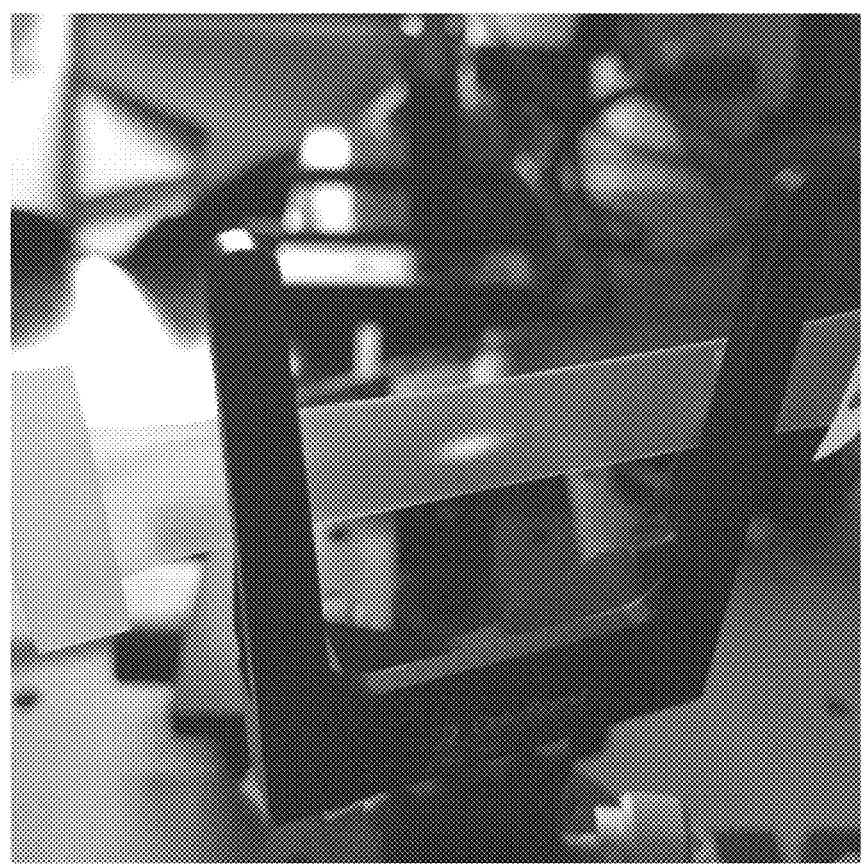
FIG. 6 is a photograph of the state of emission from the film according to Example 1.
Figure 7:
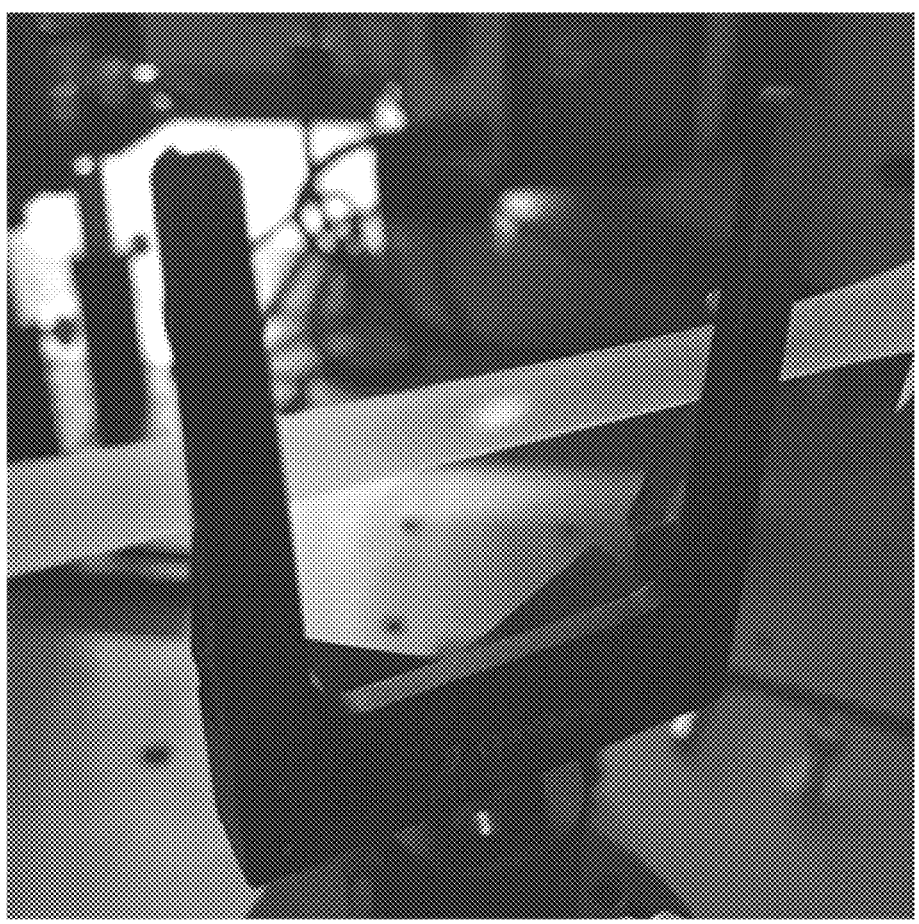
FIG. 7 is a photograph of the state of emission from the film according to Example 4.

FIG. 6 is a photograph of upconversion emission captured in Example 1. FIG. 7 is a photograph of upconversion emission captured in Example 4.

As illustrated in FIGS. 6 and 7, it has been confirmed that irradiated areas cause upconversion emission, and any areas of the films cause the emission. Such films are expected to provide large-area emission, and can be widely used in various applications.

Upconversion films according to the present invention can be provided as, for example, films having thicknesses of about 20 to about 40 μm, and can be used in various applications; in particular, the films cause upconversion emission with stability even in the case of repeated irradiation with light in the air, and hence are suitably used in the air. In addition, the films are easy to process and inexpensive, and hence can be widely used in various applications.

The invention claimed is:

1. A photon upconversion film being a stretched film formed of a composition comprising an acceptor, a donor, and a matrix resin, wherein the matrix resin is a poly(vinyl alcohol)-based resin, and the matrix resin is oriented by stretching.

2. The photon upconversion film according to claim 1, wherein the acceptor is a compound having a naphthalene structure, an anthracene structure, a pyrene structure, a perylene structure, a tetracene structure, or a Bodipy structure.

3. The photon upconversion film according to claim 2, wherein the acceptor is a compound represented by Formula (1) below:

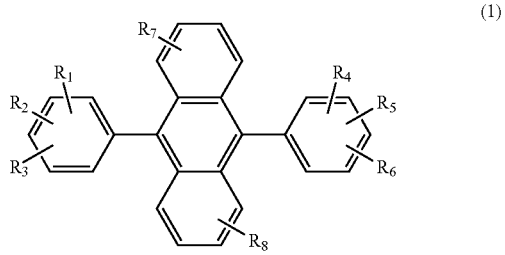
(1)

wherein $R_1$, $R_2$, $R_3$, $R_4$, $R_5$, $R_6$, $R_7$ and $R_8$ each independently represent a hydrogen atom, a halogen atom, a cyano group, an amino group having an optionally branched alkyl chain having 1 to 8 carbon atoms, an optionally branched alkyl group having 1 to 12 carbon atoms, an optionally branched alkoxy group having 1 to 12 carbon atoms, an ethylene oxide chain represented by Formula (2) below or Formula (3) below, or an ammonium ion represented by Formula (4) below:

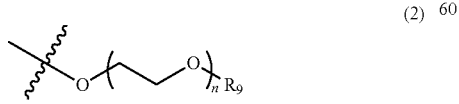
(2)

wherein $R_9$ represents an alkyl group having 1 to 3 carbon atoms, and n represents an integer of 1 to 4;

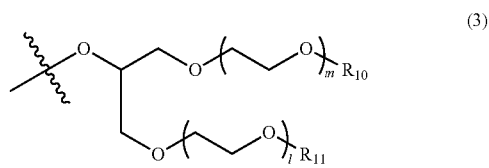
(3)

wherein $R_{10}$ and $R_{11}$ each independently represent an alkyl group having 1 to 3 carbon atoms, and m and l each independently represent an integer of 1 to 4; and

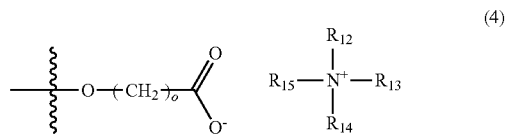
(4)

wherein o represents an integer of 1 to 8, and $R_{12}$, $R_{13}$, $R_{14}$ and $R_{15}$ each independently represent an optionally branched alkyl group having 1 to 6 carbon atoms.

4. The photon upconversion film according to claim 1, wherein the donor is a compound having a porphyrin structure, a phthalocyanine structure, or a fullerene structure.

5. The photon upconversion film according to claim 4, wherein the donor is a compound represented by Formula (5) below:

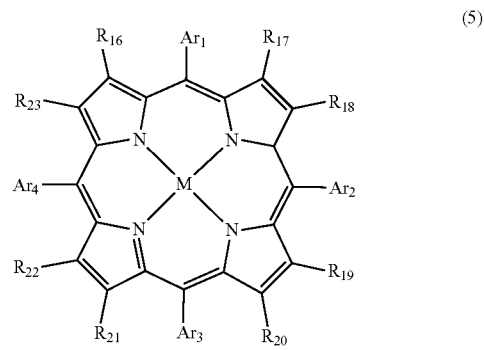
(5)

wherein $R_{16}$, $R_{17}$, $R_{18}$, $R_{19}$, $R_{20}$, $R_{21}$, $R_{22}$ and $R_{23}$ each independently represent a hydrogen atom, a halogen atom, a cyano group, an amino group having an optionally branched alkyl chain having 1 to 8 carbon atoms, an optionally branched alkyl group having 1 to 12 carbon atoms, an optionally branched alkoxy group having 1 to 12 carbon atoms, or an ethylene oxide chain represented by Formula (6) below; M represents a hydrogen atom, platinum, palladium, zinc, or copper; $Ar_1$, $Ar_2$, $Ar_3$ and $Ar_4$ each independently represent a hydrogen atom, a substituent represented by Formula (7) below, Formula (8) below, or Formula (9) below, or an ammonium ion represented by Formula (10) below:

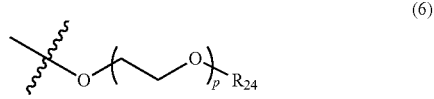
(6)

wherein $R_{24}$ represents an alkyl group having 1 to 3 carbon atoms, and p represents an integer of 1 to 4;

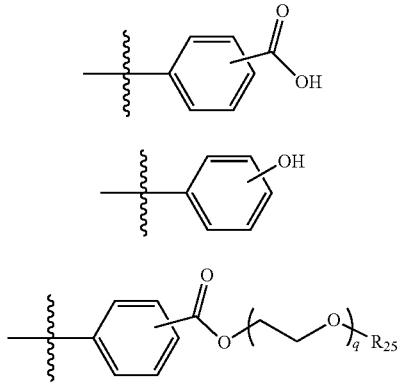

(7)

(8)

(9)

wherein $R_{25}$ represents an alkyl group having 1 to 3 carbon atoms, and q represents an integer of 1 to 4; and

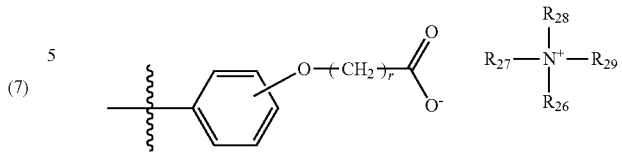

(10)

wherein r represents an integer of 1 to 8, and $R_{26}$, $R_{27}$, $R_{28}$ and $R_{29}$ each independently represent an optionally branched alkyl group having 1 to 6 carbon atoms.

6. The photon upconversion film according to claim 1, wherein an orientation function is 0.05 or more.

7. A method for producing a photon upconversion film, the method comprising a step of stretching a composition comprising an acceptor, a donor, and a matrix resin, wherein the matrix resin is a poly(vinyl alcohol)-based resin, and the stretching is wet-stretching in an aqueous solution of boric acid.

8. The method for producing a photon upconversion film according to claim 7, wherein the acceptor and the donor have a hydrophilic substituent.

\* \* \* \* \*